United States Patent
Balachandran et al.

(10) Patent No.: US 10,623,328 B1
(45) Date of Patent: Apr. 14, 2020

(54) MESSAGE BROKERING FOR ASYNCHRONOUS STATUS UPDATES

(71) Applicant: West Corporation, Omaha, NE (US)

(72) Inventors: Karthika Balachandran, Omaha, NE (US); Kerry McMurtry, Papillion, NE (US); Jason Randall Nash, Shawnee, KS (US); Subhash Parthibhan, Omaha, NE (US)

(73) Assignee: West Corporation, Omaha, NE (US)

( * ) Notice: Subject to any disclaimer, the term of this patent is extended or adjusted under 35 U.S.C. 154(b) by 0 days.

(21) Appl. No.: 16/003,274

(22) Filed: Jun. 8, 2018

(51) Int. Cl.
*H04L 12/863* (2013.01)
*H04L 12/26* (2006.01)

(52) U.S. Cl.
CPC .......... *H04L 47/50* (2013.01); *H04L 43/0858* (2013.01); *H04L 43/16* (2013.01)

(58) Field of Classification Search
CPC ..... H04L 47/00; H04L 47/50; H04L 43/0858; H04L 43/16
USPC ......................................... 370/241, 412–418
See application file for complete search history.

(56) References Cited

U.S. PATENT DOCUMENTS

| | | | | |
|---|---|---|---|---|
| 8,593,946 B2* | 11/2013 | Goldstein | ........... | H04L 41/0631 370/229 |
| 2004/0064589 A1* | 4/2004 | Boucher | ................. | H04L 69/16 709/250 |
| 2004/0078480 A1* | 4/2004 | Boucher | ................. | H04L 29/06 709/237 |
| 2006/0233108 A1* | 10/2006 | Krishnan | .............. | H04J 3/1682 370/235 |
| 2008/0148258 A1* | 6/2008 | Regnier | ................ | G06F 9/4843 718/100 |
| 2008/0281906 A1* | 11/2008 | Ogasawara | ........... | G06F 9/5027 709/203 |
| 2008/0301709 A1* | 12/2008 | Ban | ..................... | H04L 12/1813 719/314 |
| 2009/0070766 A1* | 3/2009 | Berman | .................. | G06F 9/505 718/104 |
| 2012/0066313 A1* | 3/2012 | Ban | ......................... | G06F 9/546 709/206 |
| 2017/0317944 A1* | 11/2017 | John | ...................... | H04L 47/56 |
| 2018/0165138 A1* | 6/2018 | Rao | ......................... | G06F 9/542 |

* cited by examiner

*Primary Examiner* — Candal Elpenord

(57) ABSTRACT

One example method of operation may include one or more of receiving messages from different clients, storing the messages in a queue, identifying the clients assigned to the messages, assigning the messages to different threads in a thread pool based on the identified clients, and processing the messages via the different threads.

14 Claims, 7 Drawing Sheets

MESSAGE BROKERING FOR ASYNCHRONOUS STATUS UPDATES

TECHNICAL FIELD OF THE APPLICATION

This application generally relates to optimizing message brokering and more specifically to providing optimized message brokering for asynchronous status updates.

BACKGROUND OF THE APPLICATION

Conventionally, in a typical platform-as-a-service (PaaS) environment, or similar applications), the service provider receives requests from multiple clients, and the service provider acknowledges the requestor with an acceptance notice. The service provider processes the requests in a backend processing platform and when processing is completed, the service provider updates the client with final and intermediate statuses. Those updates may include message processing, call processing, etc. Some examples of service providers may include a commercial outbound short message service (SMS) service, a wireless messaging platform service and/or a voice extensible markup language service (VXML), such as a VXML outdialer service, etc.

In such service environments, all clients are impacted if one of the clients fails due to latency, failed messaging, etc. Service providers typically utilize shared worker threads to update clients with statuses of a message and other service processing. In this example, if one of the clients is slow to respond then eventually all threads will be utilized for the same destination, which eventually causes high backlogs at the service provider processing platform, which in turn, affects throughput for all clients.

In one specific example, a multi-channel network platform (MCN) generates voice notifications through a VXML outdialer platform. Requests are submitted to the VXML outdialer and an acknowledgement notice is returned. Next, the outdialer may provide an update with a final status after voice notification has been delivered (i.e., end user has been contacted). The MCN provides a URL to the VXML outdialer to post-back the disposition. When call/message delivery is complete, the outdialer uses the provided URL to update the MCN with a status. Usually, the URL refers to one of the many MCN web servers that will listen for those receipts. If one of the MCN web servers fails, for instance, if attempts by the outdialer to post statuses to the MCN time-out, then eventually all worker threads will be utilized for that MCN web server.

In a more specific scenario, if an average response time is 500 ms (milliseconds), and response time for error conditioning is 30 seconds (30000 ms), then 60 requests can be delivered in the duration it takes for one request to time out. If there are 600 requests and those requests are equally distributed across 10 MCN web servers, then one request for a failing web server can be expected for every 10 requests assuming an equal distribution. In this example, a worker thread will be requested to post to a failing server every 5 seconds (i.e., 500*10 ms), and if there are five worker threads then time taken to process 600 requests will increase from 60 seconds to around 400 seconds, and typical volume in commercial outbound platforms are around 1-2 million per hour or around 300 requests per second resulting in exponential increases in delays.

In such scenarios, the low volume clients will suffer the worst results when there are one or more high volume clients. Some clients generate more traffic than others. For example, the call/messaging requirements of one client may generate traffic at the rate of one million requests per hour which is considerably higher than another client which generates traffic of less than 1000 requests per hour. In this example, if both the clients request to be updated with final disposition statuses, then one request from the smaller client will be processed for every 1000 requests from the larger client. In such a case, if the response times are one second and there are five worker threads then the smaller client will be updated initially with a delay of 100 seconds and this delay accumulates with increasing volume. For instance, 1000 requests from the smaller client will take 100*1000 seconds to process when the requests from the larger client are processed at a similar rate.

In the event that persistence is implemented at the service provider end (e.g., use of message broker that persists backlogged messages), then a high backlog will trigger other issues such as, failing to meet real time restrictions/expectations of the clients. Some applications rely on disposition status to implement business logic. In one example, if a client cannot be reached through voice then attempt to contact the client through SMS, and if a disposition for a first attempt does not arrive then a second attempt cannot be made. For instance, if a client wants to deliver a specific number of notifications in an hour and if dispositions do not arrive in time, then upstream applications that implement the throttle cannot decide how many more requests to generate in the given interval. Also, if any of the service providers further downstream fail, and if dispositions do not arrive on time, then the upstream application may generate more requests further widening the impact. This scenario is more likely to occur with wider windows.

SUMMARY OF THE APPLICATION

Example embodiments of the present application may provide a method that includes one or more of receiving one or more messages from one or more clients, transmitting one or more receipt notice messages acknowledging the one or more messages were received, assigning the one or more messages to a first thread of a plurality of threads in a thread pool, and determining whether the one or more messages are processed in a predefined threshold amount of time assigned to the first thread.

Another example embodiment may provide an apparatus that includes a receiver configured to receive one or more messages from one or more clients, a transmitter configured to transmit one or more receipt notice messages acknowledging the one or more messages were received, and a processor configured to perform one or more of assign the one or more messages to a first thread of a plurality of threads in a thread pool, and determine whether the one or more messages are processed in a predefined threshold amount of time assigned to the first thread.

Still another example embodiment may provide a non-transitory computer readable storage medium configured to store instructions that when executed cause a processor to perform one or more of receiving one or more messages from one or more clients, transmitting one or more receipt notice messages acknowledging the one or more messages were received, assigning the one or more messages to a first thread of a plurality of threads in a thread pool, and determining whether the one or more messages are processed in a predefined threshold amount of time assigned to the first thread.

Yet a further example embodiment may provide a method that includes one or more of receiving a plurality of messages from a plurality of different clients, storing the plurality of messages in a queue, identifying the clients assigned to the messages, assigning the plurality of messages to different threads in a thread pool based on the identified clients, and processing the plurality of messages via the different threads.

Yet another example embodiment may provide an apparatus that includes a receiver configured to receive a plurality of messages from a plurality of different clients, and a processor configured to perform one or more of store the plurality of messages in a queue, identify the clients assigned to the messages, assign the plurality of messages to different threads in a thread pool based on the identified clients, and process the plurality of messages via the different threads.

Still yet a further example embodiment may provide a non-transitory computer readable storage medium configured to store instructions that when executed cause a processor to perform one or more of receiving a plurality of messages from a plurality of different clients, storing the plurality of messages in a queue, identifying the clients assigned to the messages, assigning the plurality of messages to different threads in a thread pool based on the identified clients, and processing the plurality of messages via the different threads.

DETAILED DESCRIPTION OF THE APPLICATION

Figure 1A:
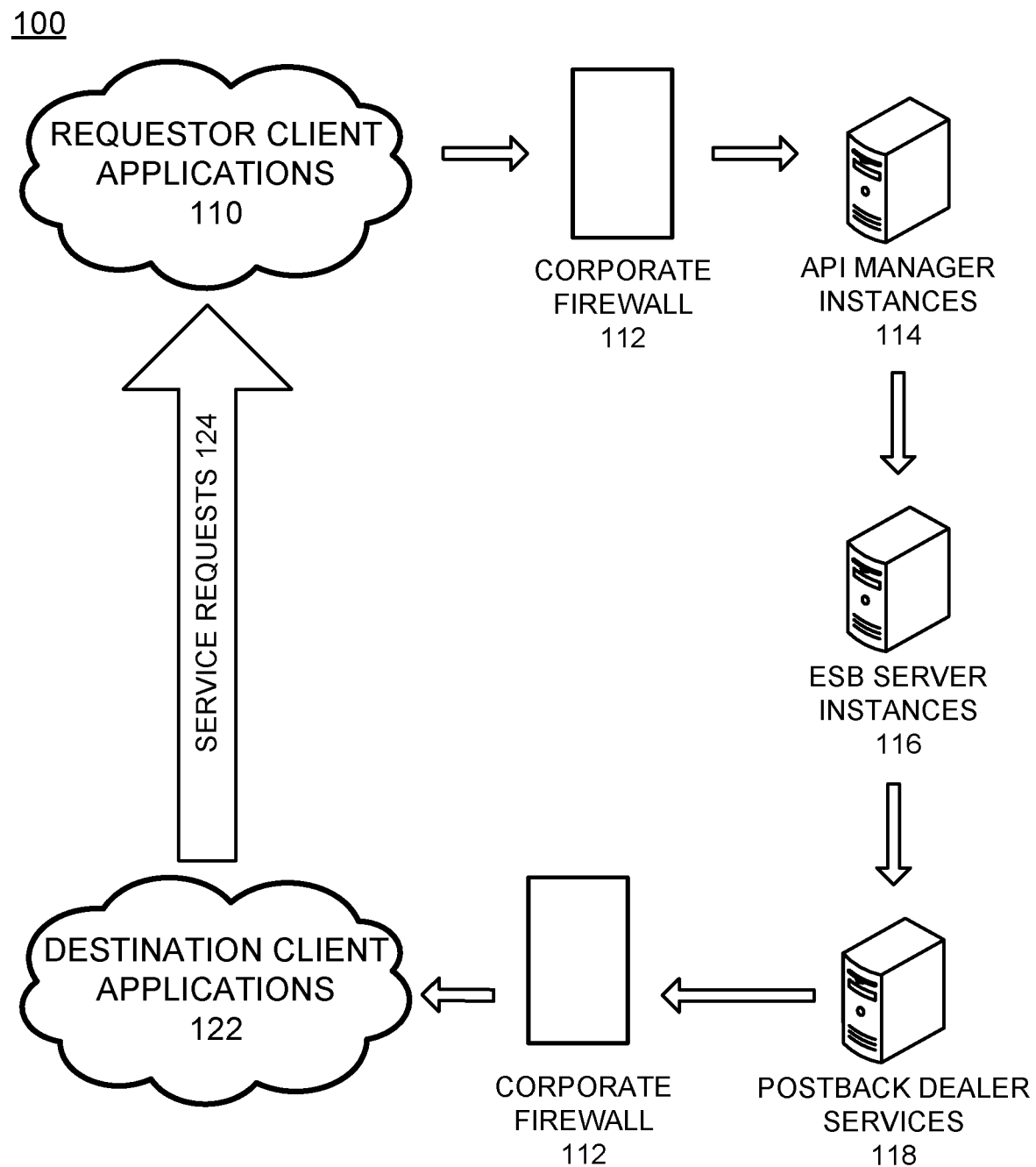
FIG. 1A illustrates an example network configuration of a postback dealer operating in an external integration configuration according to example embodiments.

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present application, the application may be applied to many types of network data, such as, packet, frame, datagram, etc. For purposes of this application, the term "message" also includes packet, frame, datagram, and any equivalents thereof. Furthermore, while certain types of messages and signaling are depicted in exemplary embodiments of the application, the application is not limited to a certain type of message, and the application is not limited to a certain type of signaling.

According to example embodiments, a client system may implement certain features, functions and procedures to optimize message request processing. For instance, a client system can have different processing times and time delays which can be transient or permanent. A volume of requests per client would vary across time, and if priority is assigned based on volume then priorities will dynamically change for destinations. Submission of requests are not preemptive and once a request is initiated, a wait period of time is required for completion. It is generally not possible to stop and switch to another task then come back to the original task. For individual clients, statuses could be updated in a first-in-first-out basis. Repetitions could be minimized, a loss of messages should also be minimized, and volume processing may be consistently above a certain capacity, for example, client applications can be updated with statuses after the notifications were generated.

Also, higher volume clients should be given higher priority due to higher revenue potential, and response times should be included as a factor in the scheduling logic. Other features may include facilitating alternate modes of delivery, such as a pull model as opposed to a push model. Additionally, a consistent low latency, or fast response times, should be afforded irrespective of a particular destination.

One example embodiment may provide a circuit breaker style approach to managing message services based on a postback dealer service that serves to provide posting back disposition statuses to clients while addressing the known dilemmas and constraints associated with such clients. In one example, a postback dealer service is exposed as a REST interface internally and externally through an enterprise service bus (ESB). The postback dealer also enables a PUB/SUB model through a message broker that permits clients to directly subscribe and receive messages from the message broker as opposed to delivery channels, such as a hypertext transfer protocol (HTTP). The message broker may be a server, an application and/or a combination of hardware and software that provides the message processing logic to manage and execute requests which are received.

A circuit breaker function may be utilized at a client end (i.e., client computing device) for recovery when service providers take longer to respond than anticipated or experience outages. However, the 'circuit breaker' function is implemented at the server end to better respond to clients in a push model. The circuit breaker is maintained for each destination for a rolling window even though worker threads are shared across destinations.

In operation, a postback dealer exposes a representational state transfer (REST) service interface through the enterprise bus server (ESB). The postback dealer also permits directing posting of requests to a message broker application in addition to the REST interface. The messages may be received, processed, queued and executed in an order specified by the message processing logic.

A client may post to the REST interface via a defined JAVA script object notation (JSON) format. The postback dealer posts the message to an internal message broker and acknowledges the requestor with a receipt notice message that acknowledges the request was received, and may also include other information regarding the processing of the message request. The postback dealer internally maintains various pools of worker threads or 'lanes', which provide, for example, four different lanes, such as a fast lane thread pool to work on fast responding clients, a fast overflow lane thread pool to work on fast responding high volume clients, a slow lane thread pool to work on slow responding clients and a slow overflow lane thread pool to work on slow responding high volume clients.

The postback dealer utilizes a circuit breaker implementation to restrict resource usage. In a commercial implementation, a circuit breaker library may be utilized. The postback dealer listens for requests from a message broker and starts processing through a fast lane, and depending on the state of the circuit breaker and error statistics for the destination, requests will be diverted to one of the four lanes. If requests cannot be processed through any of the four lanes or if there are error conditions, then requests will be stored in a queue and scheduled for a retry. The retries are implemented with configurable values for a maximum number of attempts and intervals between the attempts.

In addition to multiple thread pools within each postback dealer instance, multiple instances will be instantiated dynamically on an as-needed basis to better handle the volume and all message dealer instances will consume from a same message broker topic. Additionally, clients can directly consume from the postback dealer's message broker if clients do not prefer a HTTP channel.

Criteria used for evaluating responsiveness of destinations are "response time" and "failure rate". "Response time" refers to how long the destination server took to accept an incoming request and provide an acknowledgement with a "success" status. Applications post responses to client servers with statuses of tasks that were executed asynchronously. In operation, a client application submits requests for notification delivery or any other service, and the service provider applications validate and acknowledge those requests. Service provider applications then process those requests in the backend with or without involvement from client applications that requested the service and updates the client applications with a status on task completion. An identifier is provided with responses so that the client application can match the responses with corresponding requests.

The circuit breaker based message broker is customized for posting back disposition statuses over HTTP connections. "Response time" thus refers to how long the destination server took to respond with a HTTP status '200' type message, when disposition status (usually in XML format) was submitted using the HTTP POST approach. Similarly, request submissions are treated as failures when HTTP status '500s' are returned by the destination server or the request submission times-out. The threshold time used for determining the circuit health or the statistical data maintained for different endpoints in each lane may also provide a status update.

This instant application in one embodiment relates to optimizing message brokering and in another embodiment, relates to providing optimized message brokering for asynchronous status updates.

FIG. 1A illustrates an example network configuration of a postback dealer operating in an external integration configuration according to example embodiments. Referring to FIG. 1A, the configuration 100 includes various clients, which may be identified from their custom client applications. The needs, requirements, volume, contractual agreements, etc., of each client may be different and may be identifiable from their application interfaces 110, which operate on one side of a firewall 112 managed by an API manager which may have various API manager instances 114, which in turn require corresponding ESB server instances 116 operating with the postback dealer services 118 to manage the requests. The ordering/processing logic and deployment of the messages past the firewall 112 and onto the intended destinations may include various destination client applications 122. The destinations may keep the cycle active by submitting new service requests 124, which may require additional responses by the requestor clients 110.

Figure 1B:
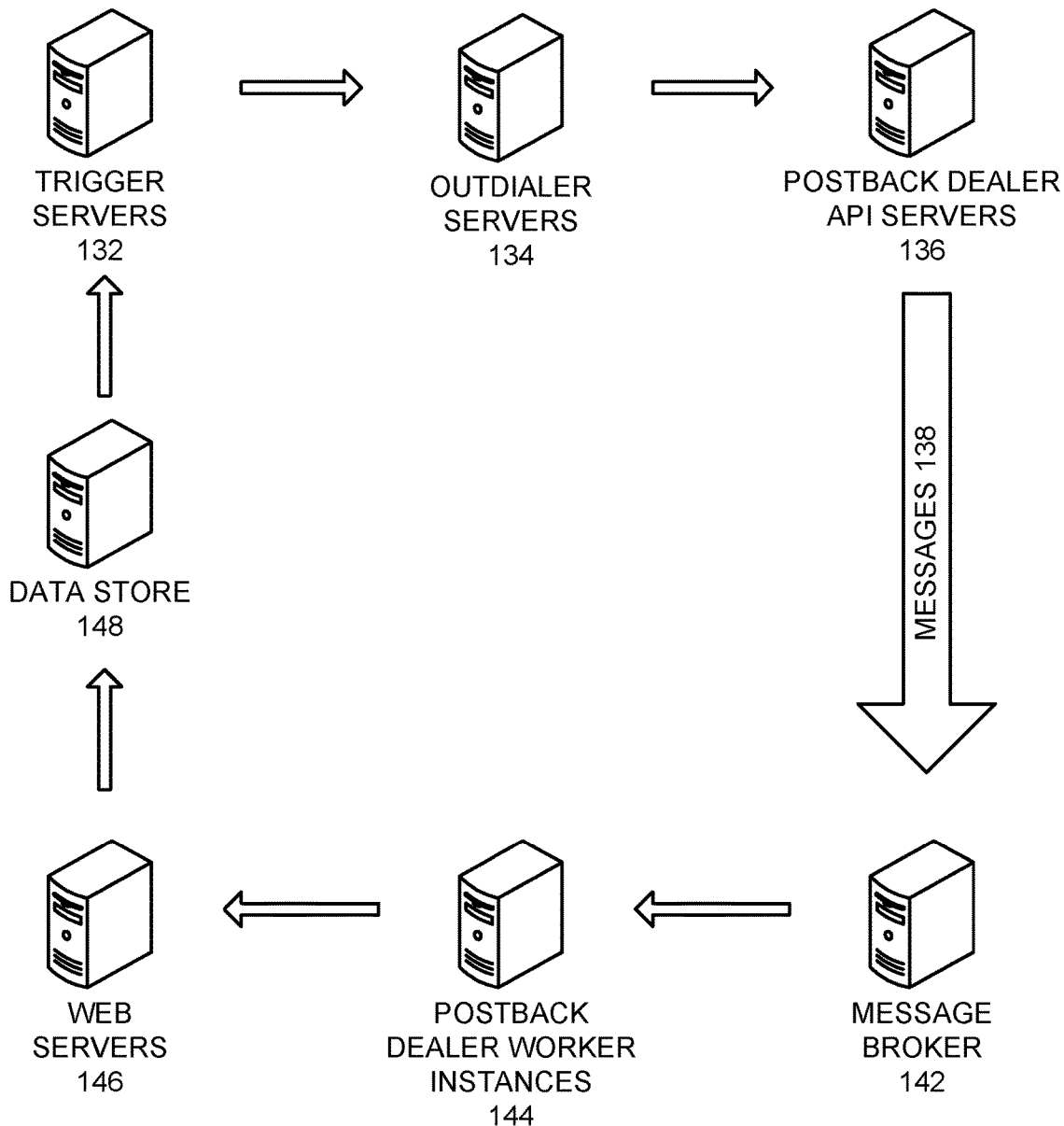
FIG. 1B illustrates an example network configuration of a postback dealer operating in an internal integration configuration according to example embodiments.

FIG. 1B illustrates an example network configuration of a postback dealer operating in an internal integration configuration according to example embodiments. Referring to FIG. 1B, the network configuration 130 includes trigger servers 132, which are used to identify new requests or events. The outdialer servers 134 manage calls. The postback dealer API servers 136 provide messages 138 to the message broker 142 for delegation and processing. The postback dealer worker instances 144 send the messages to the appropriate parties via web servers 146, which access a data store to store and retrieve data.

The trigger servers 130 are workers (clients) belonging to a multi-channel network (MCN) application that will submit a request to a VXML outdialer application (service provider) to generate a voice notification. The outdialer servers 134 offer a service provider application that interacts with interactive voice response (IVR) units to generate voice notifications and post back dispositions or task execution statuses to the MCN. The postback dealer API servers 136 provide an implementation of a "circuit breaker based message dealer" API web interface hosted on multiple servers. The message broker 142 cluster provides a FIFO queue. The message dealer API will post incoming requests to this common queue and will read the requests later when ready to process or the requests have matured. The postback dealer worker instances 144 provide an implementation of a circuit breaker based message dealer core, that will process incoming requests and deliver the requests to remote destinations utilizing fast and slow lanes. The web servers 146 belong to a MCN application that will listen for dispositions from the VXML outdialer for earlier submitted requests. Listeners are usually ASP pages that will validate and process incoming disposition submissions. The data store 148 is a database where MCN maintains statuses of different requests submitted to the VXML outdialer application. MCN will determine when to re-submit a request based on a disposition received, such as when an end user did not receive the phone call and per business rule, then the MCN should retry contacting that end user after 3 minutes or another predefined period of time.

One example provides receiving postback requests from different applications including third parties located externally and delivering those requests to corresponding destination URLs for HTTP based postbacks. Another example provides a mechanism to accept and deliver postback requests to different clients with varied responsiveness, variable response times and instability, with frequent down times using a circuit breaker design pattern. The application that accepts and delivers the post back requests is identified as a circuit breaker-based message dealer. In operation, the application exposes a web service that will accept incoming requests and post them to a first in first out (FIFO) queue facilitated by an open source message broker. The application then fetches requests from the common input queue and processes them using the concept of "lanes". Through the term "lane", destinations are grouped together that have similar responsiveness. All destinations are initially considered to be fast and reliable, however based on subsequent interactions, their responsiveness is re-evaluated and demoted to slow moving lanes. Through continuous and ongoing evaluation, clients are motivated to provide fast responding endpoints or destinations. Faster responses are rewarded with better delivery rate while slower responses will result in a poor/slow delivery rate.

Figure 1C:
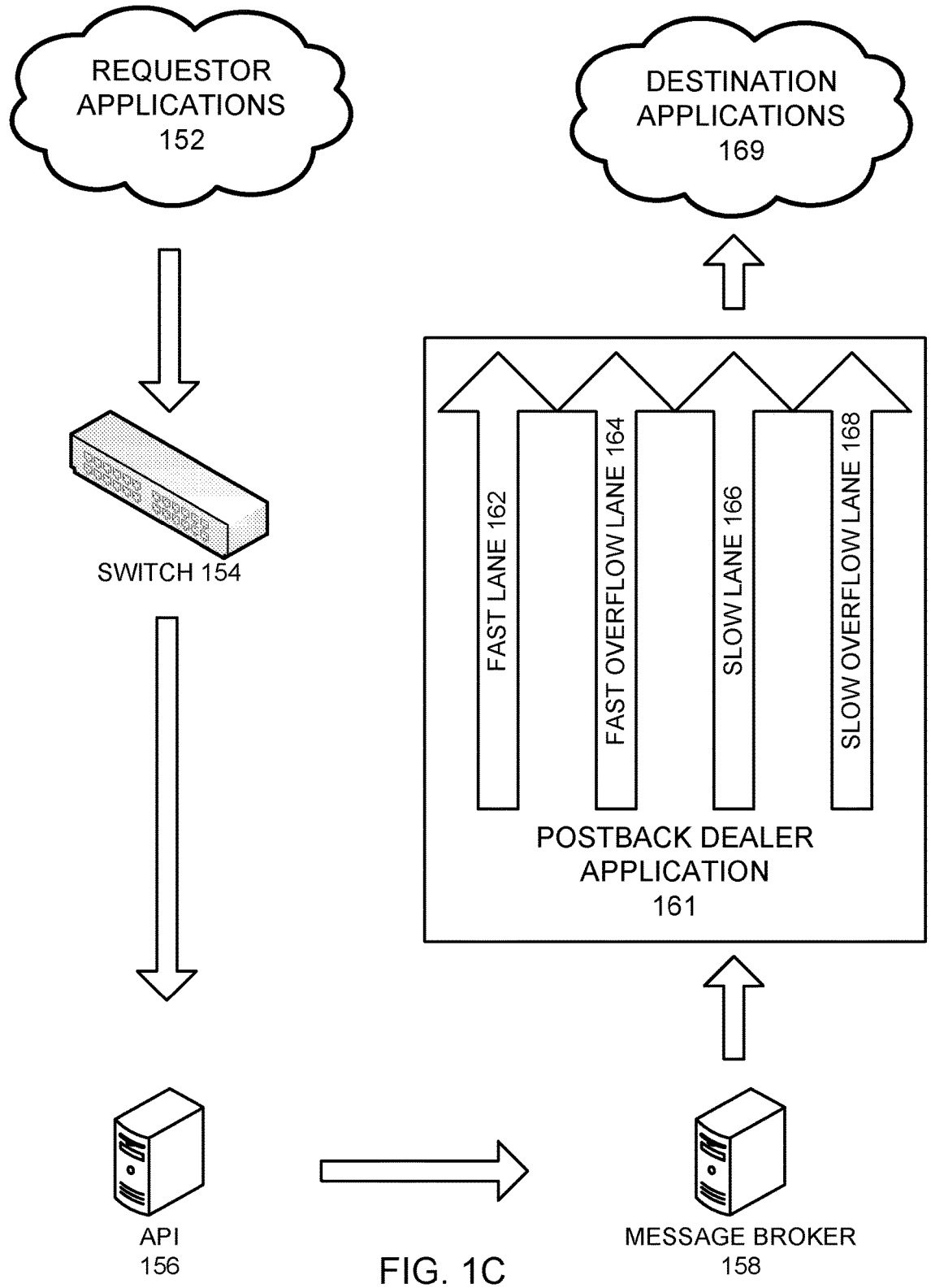
FIG. 1C illustrates an example network configuration of a postback dealer data flow configuration including a dealer application according to example embodiments.

FIG. 1C illustrates an example network configuration of a postback dealer data flow configuration including a dealer application according to example embodiments. Referring to FIG. 1C, the example configuration 150 provides a requestor application(s) 152 processing incoming messages, which are distributed to a switch/router device 154 and processed at a API device 156, such as a REST API. The message broker 158 may be responsible for processing the incoming messages and initiating a postback dealer application 161. The application includes various options for processing the messages, including a fast lane 162, a fast overflow lane 164, a slow lane 166 and a slow overflow lane 168, which are intended for specific client requirements. The message may be processed by any of the various lanes and forwarded to the destinations via the destination application 169. Switch 154 provides support for any API that is hosted on multiple instances within a data center are usually exposed through a local traffic manager (LTM) virtual IP address (VIP), and LTM VIPs across multiple sites are exposed through a global traffic manager (GTM) wide IP (WIP). To avoid product specifics, it can be specified that a load balancer will be utilized to distribute incoming traffic to different circuit breaker based message dealer instances.

Each of the lanes 162-168 have a separate group of worker threads that process requests assigned to that lane. Each endpoint or destination URL will have statistics maintained separately for each lane that are continuously updated based on responsiveness (e.g., response times, failure rates, etc.). Statistics are maintained using a rolling time window, such that beyond a specified time interval, older data will be removed from consideration. We are treating each destination URL and corresponding lane as a "circuit" relying on a representative "circuit breaker" design pattern. When a destination performs poorly, then statistics for that endpoint in that particular lane will exceed the threshold value causing that "circuit" to be tripped. In other words, no more requests can be processed through that "circuit" until the tripped "circuit" re-opens after a specified threshold time interval (e.g., one minute), as statistical data will be refreshed based on the rolling time windows.

Faster lanes will have thresholds defined such that they will be more sensitive and trip much earlier on poor responsiveness, while slower lanes will be more accommodating, and in turn, slower moving. For example, the fast lane 162 may be configured to trip if a destination server does not respond within 3 seconds while slow moving lanes may be configured to trip only if a server does not respond even after 30 seconds. Those times demonstrated may be variable as identified by one skilled in the art. When a fast lane circuit 162 is tripped, requests for that destination are moved to a slow lane 166 and when the slow lane circuit is tripped, requests are suspended and scheduled for a retry without additional processing.

Additionally, "overflow" lanes 164 and 168 have been introduced to accommodate the scenarios where a single high-volume client can deprive slow volume clients. Requests are moved to "overflow" fast 164 and/or slow lanes 168, when a number of concurrent requests processed exceed a certain threshold value. When concurrency is beyond the threshold value for the fast lane, then new requests for that destination are diverted to the "overflow" fast lane 164, and similarly, requests are diverted to the "overflow" slow lane 168 when concurrency is beyond the threshold value for the slow lane 166.

Threshold values are defined for all lanes such that when a number of workers, irrespective of destinations, exceeds a threshold value then a request will be placed back in the FIFO queue. This approach prevents starvation and distributes work among multiple circuit breaker-based message dealer instances operating on different servers. For example, if client 'A' has submitted a million requests and client 'B' has submitted 100 requests, then requests for client 'A' will first reach the fast lane 162, and assuming circuit has not been tripped, will be processed in the fast lane 162. When the number of concurrent requests for client 'A' increases beyond the threshold configured for the fast lane, then the requests will be diverted to the overflow fast lane 164, when the number of concurrent requests for client A in the overflow fast lane 164 is beyond the threshold configured, then the requests will be diverted back to the common FIFO queue for a rescheduling effort. When client 'A' requests are put back in the common queue, then the requests for client 'B', interspersed between client 'A' requests, will now be processed and delivered, which avoids starvation of slow volume clients.

All destinations are initially considered to be 'fast' and reliable, however based on subsequent interactions their responsiveness is re-evaluated and demoted to slower moving lanes. Through continuous and ongoing evaluation, clients are motivated to provide fast responding endpoints or destinations. Faster responses are rewarded with better delivery rate while slower responses will result in poor delivery rate. Demotion is imposed through a circuit breaker design pattern. As a destination starts performing poorly (e.g., response times take longer than specified) based on a threshold time value, the circuit will get tripped in the fast lane 162 forcing requests for that destination to reach the slow lane 166. Due to rolling time windows used for endpoint statistics, requests will be processed intermittently through fast lane and if the error rate persists, then the circuits will again get tripped forcing all requests to the slow lane 166.

Retries can be triggered under certain conditions, for example, a remote server indicated a failure by returning an HTTP status 500 internal error when disposition was submitting using a HTTP POST method. Both the fast and slow lanes are tripped for a given endpoint due to a high failure rate, such as repeated timeouts etc. A number of workers in a given lane may exceed a threshold which triggers the requests to be diverted back to a FIFO queue. Criteria used for evaluating responsiveness of destinations are "response time" and "failure rate", and those two variables may be the basis of the triggers.

Factors that can trigger a given circuit, such as a destination and lane pair are 'timeout', such as requests taking longer to execute than the threshold specified for that lane and/or a submission failure (e.g., HTTP status 500). In another example, a thread pool rejection (i.e., more requests submitted than the thread pool can handle) may cause the thread pool to reject incoming requests when a number of requests submitted exceed the total number of workers and configured queue depth. Error percentages can cause changes on processing requests. Some of the values configured with the fast/overflow fast lane may include a response time out of 1 second, a thread pool size of 15, a minimum number of requests to trigger a circuit breaker logic of 40, a rolling time window of 1 minute, an error threshold percentage of 50%, a time before re-validating a tripped circuit of 10 minutes, a decision to divert to an overflow lane when 50% concurrency for a given endpoint, and a decision to re-queue back to the FIFO queue for a given lane having 75% of workers being busy.

For the slow/overflow slow lane, the response time out is 30 seconds, a thread pool size of 15, a minimum number of requests to trigger a circuit breaker logic of 40, a rolling time window for statistics of 2 minutes, an error threshold percentage of 50%, a time before re-opening a tripped circuit of 30 seconds, a decision to divert to an overflow lane of 50% concurrency for a given endpoint, and a decision to re-queue back to the queue for a given lane of 75% of workers being busy. Those skilled in the art will readily recognize that the thresholds percentages and time constraints may vary according to the implementation of the application.

Examples of message types and communication platforms which are compatible with the wireless messaging platform (WiMP) include SMS notifications, a VXML outdialer for generating voice notifications, a fax outdialer for generating fax notifications and a multi-channel network (MCN) that enables a common interface for multiple channels (e.g., voice, SMS, fax, email, push notifications, etc.). The campaign central application enables execution of various client outreach strategies, such as when to contact, the medium used to contact, etc.

Figure 2:
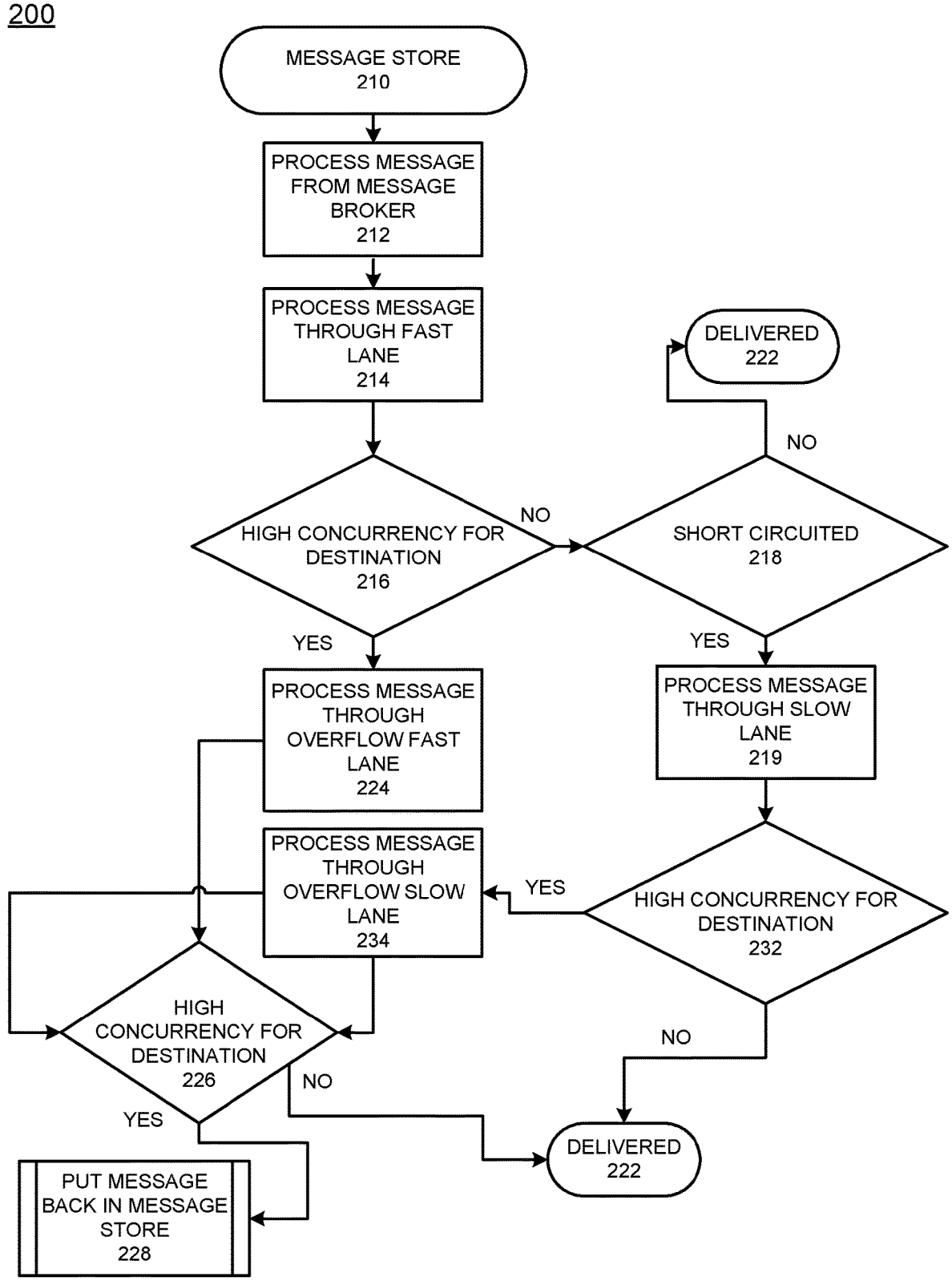
FIG. 2 illustrates a flow diagram of an example processing configuration for message processing according to example embodiments.

FIG. 2 illustrates a flow diagram 200 of an example processing configuration for message processing according to example embodiments. Referring to FIG. 2, the processing logic may provide a message store 210 which receives and processes messages for processing. The message may be processed via a message broker 212 and forwarded to a fast lane 214 depending on the client information. By default, the fast lane should be used as an initial approach to managing messages for a particular client. A decision may be made as to whether there is a high concurrency for a particular destination 216 if not the short-circuited decision may be made 218 to identify whether the delay is due to other factors, such as a non-conforming client server, etc. If not, the message is delivered 222 and if so, the message is processed through the slow lane 219 as a downgrade/demotion from the fast lane. A determination is performed to identify whether a high concurrency exists for the destination 232, and if not then the message is delivered 222. If so, the message is processed through the overflow slow lane 234 and another concurrency determination is made 226 to put the message in a message store 228 if the concurrency is high or deliver the message 222. Going back to the first determination 216, if the concurrency is high, then the message is processed through the overflow fast lane 224.

In one scenario addressing different response times and volumes, for a slower response or higher latency clients, a first request is processed through the fast lane, which triggers a timeout as time passes a threshold timeout time frame (i.e., 10, 20, 30 seconds). Next, a few more requests arrive and eventually the fast lane circuit is tripped when an error percentage exceeds a defined threshold. Now when a next request arrives, a fast lane circuit indicates that a circuit is open and request is diverted to a slow lane. This is performed to prevent slow responding clients from impacting fast responding clients. All subsequent requests are similarly directed to a slow lane until a fast lane circuit is tripped, which will be periodically verified based on the circuit breaker logic, which checks for the "short circuit". When a number of worker threads in a slow lane utilized for a same client increases beyond a threshold, then instead of processing requests through the slow lane, requests will be processed through the slow overflow lane. This is performed to handle high volume clients and at the same time avoiding starvation of low volume clients. The movement of the request from the slow lane to the slow overflow lane, new requests can still be processed.

In one example, if one million requests from a large entity and one thousand requests from a smaller entity are generated in an hour and the large entity response times are one second, and four lanes have been defined with 10 workers each with an overflow percentage defined at 50%. Then the large entity will be processed with 15 (10+5) threads while the smaller entity and other clients will have five threads available for processing. The excess requests in the overflow lane will be placed back into AMQ such that interspersed low volume clients can be processed.

In another example, with a faster anticipated response or lower latency clients, a first request is processed through a fast lane, as requests complete within defined time thresholds, no error condition is raised and all subsequent requests are continued to be processed through the fast lane. When a number of worker threads in a fast lane utilized for a same client increases beyond a defined threshold, then instead of processing requests through the fast lane, requests will be processed through the fast overflow lane. This is performed to better handle high volume clients and at the same time avoiding complete ignorance of requesting low volume clients.

A designated campaign central application may maintain an internal queue where worker threads fetch and post requests to clients. If any error conditions are identified, messages are placed back on the queue. The VXML outdialer maintains messages in a message broker and multiple postback instances consume from the topic with a dedicated worker thread pool. In addition, the VXML outdialer also permits maintaining separate client specific queues in the message broker. Another approach includes processing through multiple instances of a receipt handler with a dedicated worker thread pool that processes messages from a message broker. Additionally, a postback dealer can be compared to a SMTP proxy service that provides an API to generate email notifications. The postback dealer can be similarly defined as an HTTP proxy service that exposes a similar API.

According to example embodiments, the postback dealer can always ensures consistent low response times through the API interface and may implement a scheduler that better handles clients with varying response times, faster recovery from transient as well as permanent error conditions, and which acts as a public service provider to which anyone can submit requests, and which exposes alternate channels like message broker interfaces.

Postback functions, confirmations, etc., may be useful when attempting to provide optimal customer support. An example application supports a client's capability to generate alerts and notifications to their customers over multiple channels (e.g., voice, fax, SMS, e-mail, etc.). The applications expose web service APIs as well as other interfaces, such as FTP/SFTP for the clients to submit their requests. For a web service interface, the API acknowledges the client when their requests are successfully validated and accepted. However, there is a time lag between when a request is accepted to the time when an end user is contacted. This might happen for multiple reasons, such as when a client may specify when to contact a user even though a request was submitted much earlier. Clients also want to be notified whether alerts were generated successfully to their customer, hereinafter referred to as a 'disposition status'. They use this information to retry at a later date. For example, if an end user did not receive the phone call when dialed then the clients should be informed and they will then decide whether to contact that end user at a later date. By referring to "postback" this information about alert delivery is being identified as having been delivered to our clients. "Postback" can occur in multiple ways. Clients can proactively invoke a web service API to obtain status information about an alert request, and this process can be referred to as "polling". Alternatively, clients can request an end-of-day report that includes statuses of all requests received from that particular client during the day so that they can retry any outstanding matters the next business day.

Alternatively, clients can enable web interfaces which can be invoked to provide delivery statuses. The web interfaces can be based on PHP, JSP, ASP or any other web technology that will accept XML payloads over HTTP connections. This enables an optimal approach for delivering disposition statuses over a HTTP connection (i.e., HTTP based postbacks).

In one example, of a drugstore client and a home security system client with many customers seeking access to prescriptions, in this example, if one million requests from the drugstore customers and one thousand requests from the security company customers are generated in a single hour, and the drugstore response times are generally one second. Then, if four lanes have been defined with 10 workers each, with an overflow percentage defined at 50%, then, assuming related circuits have not been tripped, then the drugstore will be processed with 15 fast lane threads, where 10 overflow fast lane threads are used with 5 fast lane threads. As for the security company, assuming their fast lane circuits have not been tripped yet, will have 5 fast lane threads available for processing. To facilitate this, beyond a threshold percentage, excess requests in an overflow lane will be put back into a common FIFO queue such that interspersed low-volume clients can be processed. Similarly, if a minimum number of requests to trigger circuit breaker logic is 40 and error threshold percentage is 50%, then it will take at least 40 requests and 20 failures within the rolling time window to trip the overflow fast lane circuit for a given endpoint and another 40 requests and 20 failures to trip the fast lane circuit within the rolling time window. Otherwise, the application assumes that all requests are failing consistently in which case 40+40 failures within the rolling window will trip the circuits for the fast and overflow fast lanes.

Figure 3A:
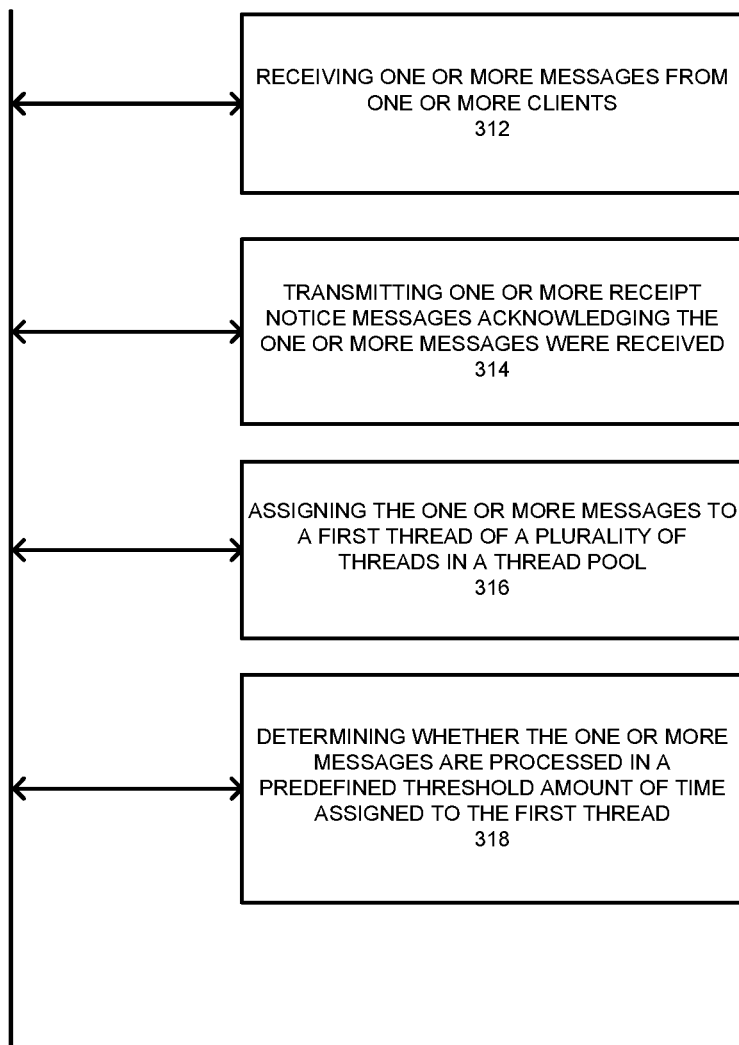
FIG. 3A illustrates an example flow diagram configuration of an example method of operation according to example embodiments.

FIG. 3A illustrates an example flow diagram configuration of an example method of operation according to example embodiments. Referring to FIG. 3A, the method 300 may include receiving one or more messages from one or more clients 312, transmitting one or more receipt notice messages acknowledging the one or more messages were received 314, assigning the one or more messages to a first thread of a plurality of threads in a thread pool 316, and determining whether the one or more messages are processed in a predefined threshold amount of time assigned to the first thread 318. The first thread is a fast thread lane having a shorter predefined threshold time requirement for message processing than at least one other of the plurality of threads in the thread pool. The method may also include determining whether the one or more messages are processed comprises determining whether the messages have reached intended destinations. When determining whether the one or more messages are processed, the method further includes receiving confirmations that the one or more messages have been delivered. The method also includes assigning the one or more messages to a second thread of a plurality of threads in a thread pool different from the first thread when the one or messages are not processed within the predefined threshold amount of time assigned to the first thread, and determining whether the one or more messages are processed within a second predefined threshold amount of time assigned to the second thread, wherein the second predefined threshold amount of time is longer than the first predefined threshold amount of time. When the one or more messages are not processed within the second predefined threshold amount of time, storing the one or more messages in a queue for a predefined amount of time and scheduling the one or messages to be processed once the predefined amount of time has lapsed.

Figure 3B:
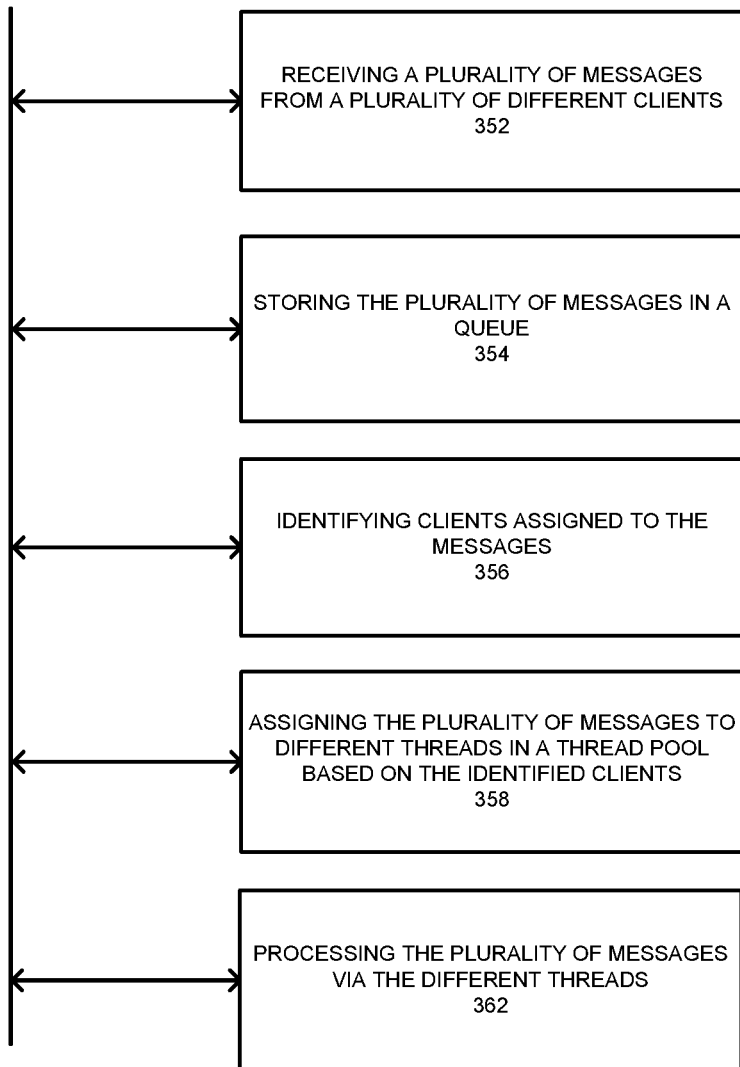
FIG. 3B illustrates another example flow diagram configuration of an example method of operation according to example embodiments.

FIG. 3B illustrates another example flow diagram configuration of an example method of operation according to example embodiments. Referring to FIG. 3B, the method 350 may include receiving a plurality of messages from a plurality of different clients 352, storing the plurality of messages in a queue 354, identifying clients assigned to the messages 356, assigning the plurality of messages to different threads in a thread pool based on the identified clients 358, and processing the plurality of messages via the different threads 362.

The method may also include identifying clients comprises identifying client reputations based on message processing compliance times and the plurality of different threads include at least one fast lane thread and at least one slow lane thread, and the fast lane thread is configured to process messages faster than the slow land thread. The different threads further include at least one fast lane overflow thread configured to process messages assigned to the fast lane thread when there is a level of concurrency for a destination that is above a threshold level of concurrency and at least one slow lane overflow thread that is configured to process messages assigned to the slow lane thread when there is another level of concurrency for another destination that is above another threshold level of concurrency. The queue is a first-in-first-out (FIFO) queue. The processing of the plurality of messages via the different threads also includes determining whether the messages have reached intended destinations. Processing the plurality of messages via the different threads further comprises receiving confirmations that the one or more messages have been delivered.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 4 illustrates an example network element 400, which may represent any of the above-described network components of the other figures.

Figure 4:
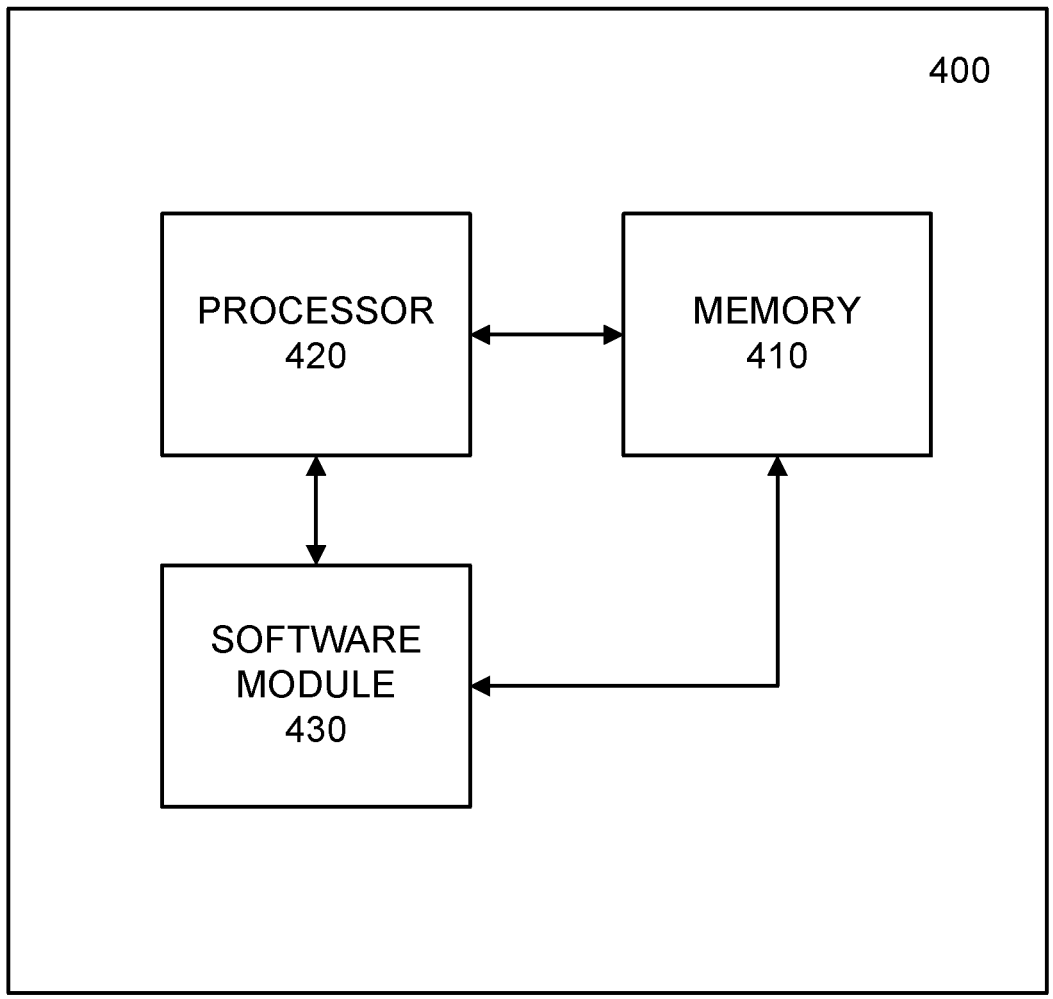
FIG. 4 illustrates an example network entity device configured to store instructions, software, and corresponding hardware for executing the same, according to example embodiments of the present application.

As illustrated in FIG. 4, a memory 410 and a processor 420 may be discrete components of the network entity 400 that are used to execute an application or set of operations. The application may be coded in software in a computer language understood by the processor 420, and stored in a computer readable medium, such as, the memory 410. The computer readable medium may be a non-transitory computer readable medium that includes tangible hardware components in addition to software stored in memory. Furthermore, a software module 430 may be another discrete entity that is part of the network entity 400, and which contains software instructions that may be executed by the processor 420. In addition to the above noted components of the network entity 400, the network entity 400 may also have a transmitter and receiver pair configured to receive and transmit communication signals (not shown).

Although an exemplary embodiment of the system, method, and computer readable medium of the present application has been illustrated in the accompanied drawings and described in the foregoing detailed description, it will be understood that the application is not limited to the embodiments disclosed, but is capable of numerous rearrangements, modifications, and substitutions without departing from the spirit or scope of the application as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments of the present application. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the application as discussed above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent, while remaining within the spirit and scope of the application. In order to determine the metes and bounds of the application, therefore, reference should be made to the appended claims.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
receiving a plurality of messages from a plurality of different clients;
storing the plurality of messages in a queue;
identifying corresponding clients, of the plurality of different clients, assigned to the plurality of messages;
assigning a message, of the plurality of messages, to a fast lane thread and assigning a message, of the plurality of messages to a slow lane thread, where the fast lane thread and the slow lane thread are in a thread pool, and the assigning is based on the corresponding clients;
identifying level of concurrency for a destination;
assigning the message, assigned to the fast lane thread, to a fast lane overflow thread when the level of concurrency is above a threshold level of concurrency;
assigning the message, assigned the slow lane thread, to a slow lane overflow thread when the level of concurrency is below a threshold level of concurrency; and
processing the messages via the assigned fast lane overflow thread and the assigned slow lane overflow thread.

2. The method of claim 1, wherein the identifying the corresponding clients comprises:
identifying client reputations based on message processing compliance times.

3. The method of claim 1, wherein the queue is a first-in-first-out (FIFO) queue.

4. The method of claim 1, wherein the processing the plurality of messages further comprises:
determining whether a message, of the plurality of messages has reached an intended destination.

5. The method of claim 4, wherein the processing the plurality of messages further comprises:
receiving a confirmation that a message, of the plurality of messages, has been delivered.

6. An apparatus, comprising:
a receiver configured to receive a plurality of messages from a plurality of different clients; and
a processor configured to:
store the plurality of messages in a queue;
identify corresponding clients, of the plurality of different clients, assigned to the plurality of messages;
assign a message, of the plurality of messages, to a fast lane thread and assigning a message, of the plurality of messages to a slow lane thread, where the fast lane thread and the slow lane thread are in a thread pool, and the assigning is based on the corresponding clients;
identify level of concurrency for a destination;
assign the message, assigned to the fast lane thread, to a fast lane overflow thread when the level of concurrency is above a threshold level of concurrency;
assign the message, assigned the slow lane thread, to a slow lane overflow thread when the level of concurrency is below a threshold level of concurrency; and
process the messages via the assigned fast lane overflow thread and the assigned slow lane overflow thread.

7. The apparatus of claim 6, wherein the processor is further configured to:
identify the corresponding clients based on message processing compliance times.

8. The apparatus of claim 6, wherein the queue is a first-in-first-out (FIFO) queue.

9. The apparatus of claim 6, wherein the processor is further configured to:
determine whether a message, of the plurality of messages has reached an intended destination.

10. The apparatus of claim 9, wherein the processor is further configured to:
receive a confirmation that a message, of the plurality of messages, has been delivered.

11. A non-transitory computer readable storage medium configured to store one or more instructions that when executed by a processor cause the processor to perform:
receiving a plurality of messages from a plurality of different clients;
storing the plurality of messages in a queue;
identifying corresponding clients, of the plurality of different clients, assigned to the plurality of messages;
assigning a message, of the plurality of messages, to a fast lane thread and assigning a message, of the plurality of messages to a slow lane thread, where the fast lane thread and the slow lane thread are in a thread pool, and the assigning is based on the corresponding clients;
identifying level of concurrency for a destination;
assigning the message, assigned to the fast lane thread, to a fast lane overflow thread when the level of concurrency is above a threshold level of concurrency;
assigning the message, assigned the slow lane thread, to a slow lane overflow thread when the level of concurrency is below a threshold level of concurrency; and
processing the messages via the assigned fast lane overflow thread and the assigned slow lane overflow thread.

12. The non-transitory computer readable storage medium of claim 11, wherein the identifying the corresponding clients comprises:
identifying client reputations based on message processing compliance times.

13. The non-transitory computer readable storage medium of claim 11, wherein the queue is a first-in-first-out (FIFO) queue.

14. The non-transitory computer readable storage medium of claim 11, wherein the processing the plurality of messages via the different threads comprises:
determining whether a message, of the plurality of messages has reached an intended destination, and
wherein processing the plurality of messages via the different threads further comprises:
receiving a confirmation that a message, of the plurality of messages, has been delivered.

* * * * *